US012669419B2

(12) United States Patent　(10) Patent No.:　US 12,669,419 B2

Greer, Jr.　(45) Date of Patent:　Jun. 30, 2026

(54) FIXTURES AND METHODS FOR TESTING ARTICLES IN TENSION WHEN USING COMPRESSION LOADING

(71) Applicant: Government of the United States, as represented by the Secretary of the Air Force, Wright-Patterson AFB, OH (US)

(72) Inventor: James M. Greer, Jr., Colorado Springs, CO (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 342 days.

(21) Appl. No.: 18/584,249

(22) Filed: Feb. 22, 2024

(65) Prior Publication Data

US 2025/0271340 A1　Aug. 28, 2025

(51) Int. Cl.
*G01N 3/08*　(2006.01)
*G01M 99/00*　(2011.01)
*G01N 3/02*　(2006.01)
*G01N 3/04*　(2006.01)

(52) U.S. Cl.
CPC ............ *G01N 3/08* (2013.01); *G01M 99/007* (2013.01); *G01N 3/02* (2013.01); *G01N 3/04* (2013.01); *G01N 2203/0016* (2013.01); *G01N 2203/0017* (2013.01); *G01N 2203/0019* (2013.01); *G01N 2203/027* (2013.01); *G01N 2203/0435* (2013.01)

(58) Field of Classification Search
CPC .. G01N 3/08; G01N 3/02; G01N 3/04; G01N 2203/0016; G01N 2203/0017; G01N 2203/0019; G01N 2203/027; G01N 2203/0435; G01M 99/007
See application file for complete search history.

(56) References Cited

U.S. PATENT DOCUMENTS

2022/0178801 A1*　6/2022　Freitag ..................... G01N 3/08

FOREIGN PATENT DOCUMENTS

CN　116754354 A　*　9/2023
KR　20140143250 A　*　12/2014　............... G01N 3/08

OTHER PUBLICATIONS

CN-116754354-A, English Translation (Year: 2023).*
KR-20140143250-A, English Translation (Year: 2014).*

* cited by examiner

*Primary Examiner* — Ryan D Walsh
(74) *Attorney, Agent, or Firm* — AFMCLO/JAZ; Jeffrey V. Bamber

(57)　ABSTRACT

Fixtures and methods for testing articles in tension when using compression loading are disclosed. The fixture is formed by three plates that are arranged to simulate a clevis-lug joint. The outer plates form the clevis, and the inner plate forms the lug. The plates each have holes that are aligned to accept the lug pin through all three holes. The center plate is attached to one end of the fixture. The outer two plates are attached to the other end of the fixture. Gaps are provided at one end of the plates to facilitate sliding of the outer plates in one direction and sliding of the inner plate in the opposite direction when compressive forces are applied to the ends of the fixture.

9 Claims, 8 Drawing Sheets

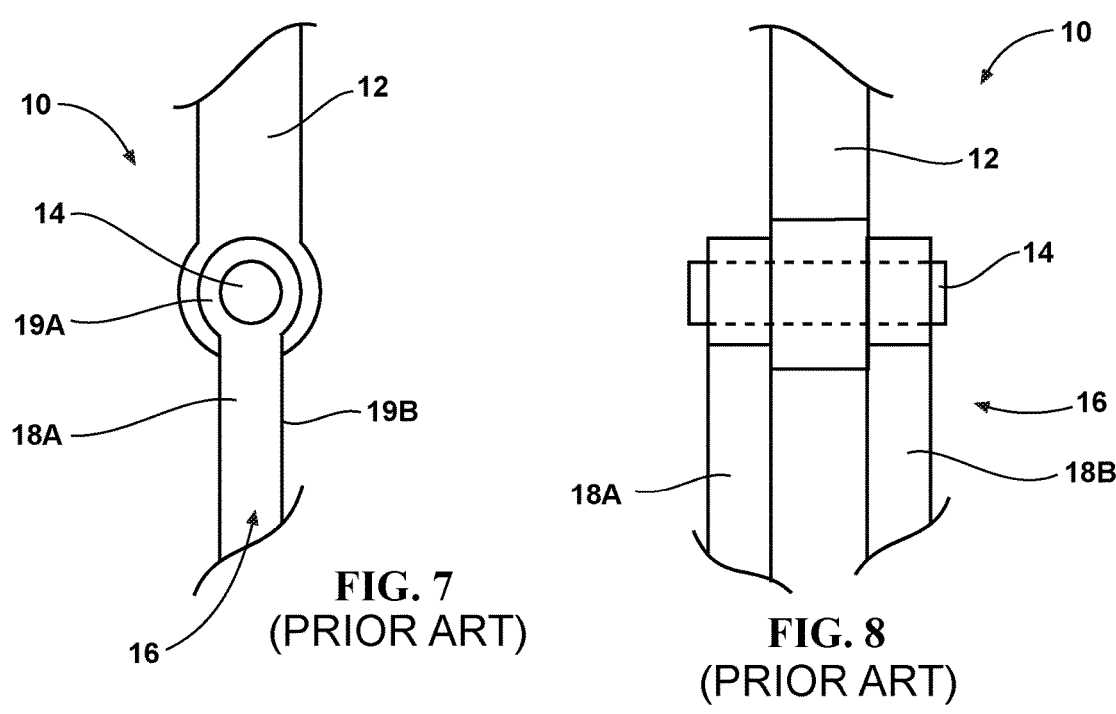
FIG. 7
(PRIOR ART)
FIG. 8
(PRIOR ART)
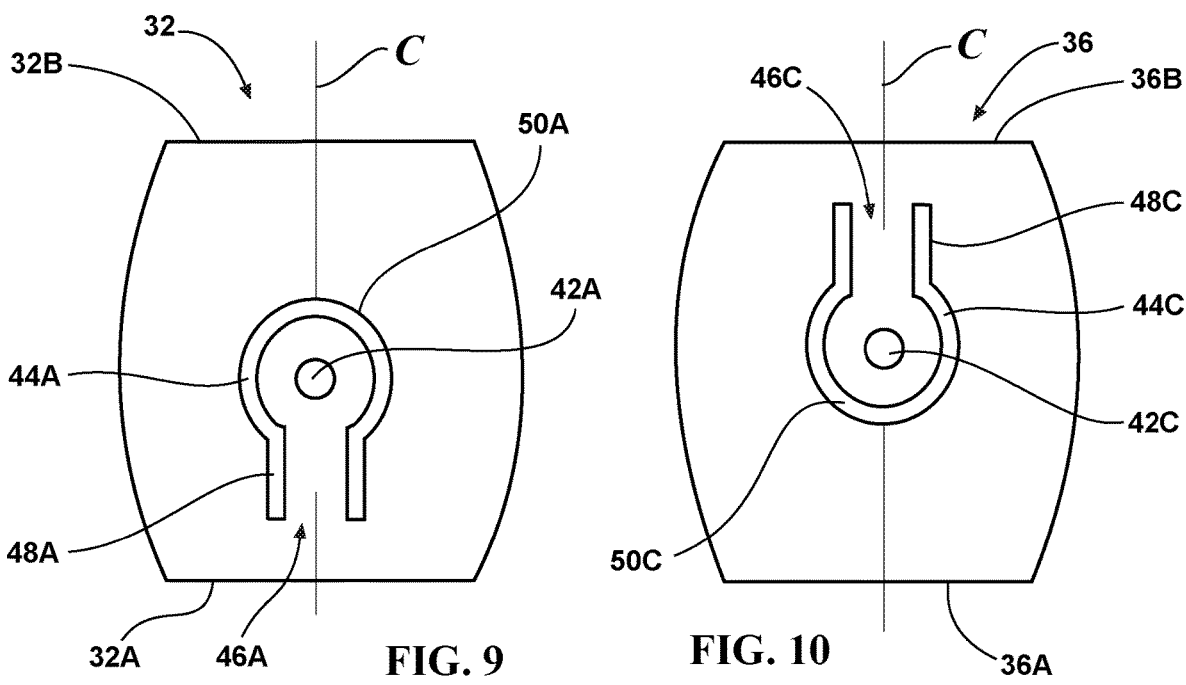
FIG. 9
FIG. 10

FIXTURES AND METHODS FOR TESTING ARTICLES IN TENSION WHEN USING COMPRESSION LOADING

RIGHTS OF THE GOVERNMENT

The invention described herein may be manufactured and used by or for the Government of the United States for all governmental purposes without the payment of any royalty.

FIELD OF THE INVENTION

The present invention relates generally to tensile testing of articles and, more particularly, to fixtures and methods for testing articles in tension when using compression loading.

BACKGROUND OF THE INVENTION

Structures that use lug joints are very common where structural joints are used. A lug is essentially a plate with a hole in it in which the hole is sized to fit a clevis pin. The ability to test proposed and existing lug joint configurations is important. Clevises are used in a wide variety of mechanically fastened joints including in farming equipment, and in the automotive, aircraft, and construction industries.

Tension lugs are typically tested using mechanical tension loading test machines that are capable of providing sufficient loads to demonstrate the different possible failure modes. However, in some cases, a laboratory may have tension machines of insufficient loading capacity to test a tension lug to failure. However, that same facility may have compression loading machines that can apply sufficient loads. Unfortunately, conventional methods of testing a tension lug in compression do not reveal the tension failure modes.

Therefore, a need exists for alternative and technically correct methods of testing tension lug joints in a laboratory environment in which tensile loading machines of sufficient capacity may not exist, but compression-loading machines of sufficient capacity are available.

SUMMARY OF THE INVENTION

The present invention relates generally to tensile testing of articles and, more particularly, to fixtures and methods for testing articles in tension when using compression loading.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a fixture for testing articles in tension when using compression loading is provided. The fixture comprises:

a first outer plate having a pin-accepting hole therethrough and a first slot therethrough that is spaced apart from the pin-accepting hole and partially surrounds the pin-accepting hole, wherein the first slot has an open end;

a second outer plate having a pin-accepting hole therethrough and a second slot therethrough that is spaced apart from the pin-accepting hole and partially surrounds the pin-accepting hole, wherein the second slot has an open end;

an inner plate having a pin-accepting hole therethrough and a third slot therethrough that is spaced apart from the pin-accepting hole and partially surrounds the pin-accepting hole, wherein the third slot has an open end, and the first outer plate, the second outer plate, and the inner plate are stacked with the inner plate located between the outer plates, wherein the first outer plate, the second outer plate, and the inner plate each have a pair of spaced apart sides and a pair of spaced apart ends, the ends comprising first ends and second ends; and a pair of end plates comprising a first end plate and a second end plate, the end plates arranged so that the first end plate is positioned adjacent the first ends of the first outer plate, the second outer plate, and the inner plate, and the second end plate is positioned adjacent the second end of the first outer plate, the second outer plate, and the inner plate, wherein the pin-accepting holes in the first outer plate, the second outer plate, and the inner plate are aligned, and the opening in the third slot is oriented in a different direction than the openings in the first and second slots, and the outer plates and the inner plates are arranged relative to the end plates so that the outer plates are movable (slidable) only in a direction from the second end plate toward the first end plate, and the inner plate is movable (slidable) only in a direction from the first end plate toward the second end plate.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 7 is a front view of an alternative prior art clevis fastener.

FIG. 8 is a side view of the alternative clevis fastener shown in FIG. 7.

FIG. 9 is a plan view of the first outer plate that can be used in a compression test fixture to simulate a prong of the clevis fastener shown in FIG. 7.

FIG. 10 is a plan view of the inner plate that can be used in a compression test fixture to simulate the lug of the clevis fastener shown in FIG. 7.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to tensile testing of articles and, more particularly, to fixtures and methods for testing articles in tension when using compression loading.

Figure 1:
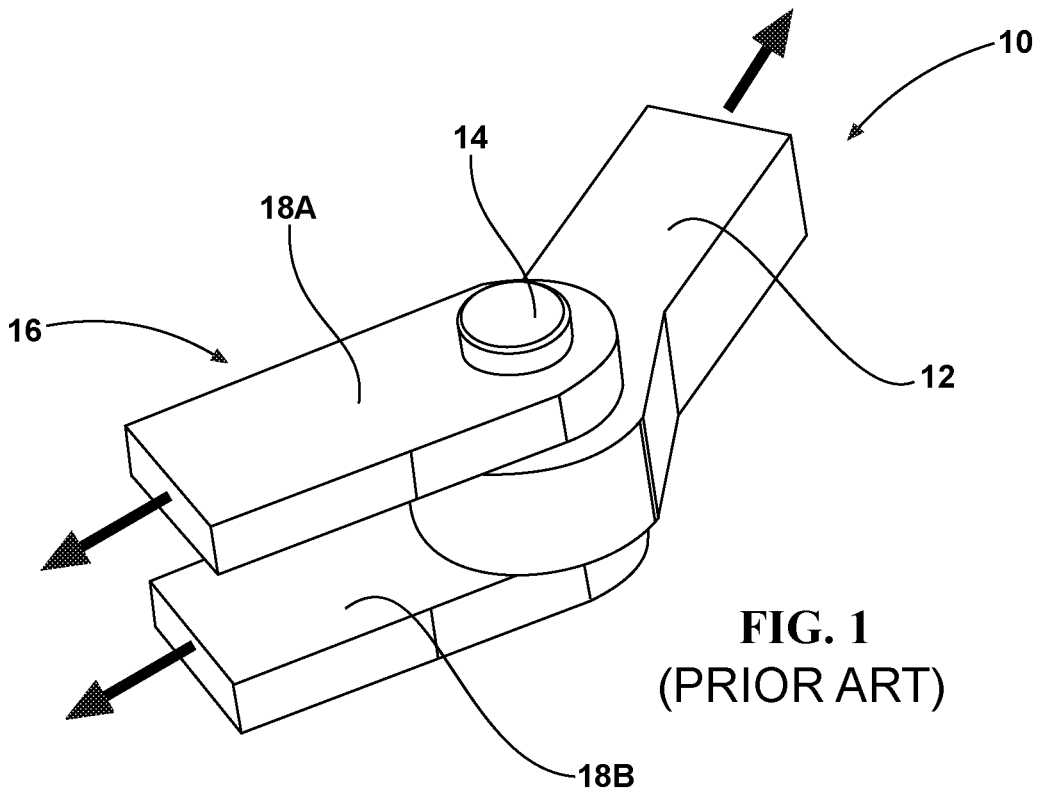
FIG. 1 is a perspective view of an obliquely loaded prior art lug joint loaded in tension.

FIG. 1 shows an obliquely loaded lug joint 10 loaded in tension. The lug joint 10 is formed by a lug 12 having a hole therein (hidden from view in FIG. 1) which is sized to insert a clevis pin (or "lug pin") 14 therethrough. The lug 12 is joined to a clevis 16 with the clevis pin 14. The clevis 16 includes two prongs (or legs) 18A and 18B that have holes at one end to accept the clevis pin 14. The two prongs 18A and 18B may have the same configuration, or they may have different configurations. The two prongs 18A and 18B may, in some cases, be joined together at their ends that are opposite the pin 14 to form part of a generally U-shaped component. In other cases, the ends of the two prongs 18A and 18B may be joined to another component or article.

Figure 1A:
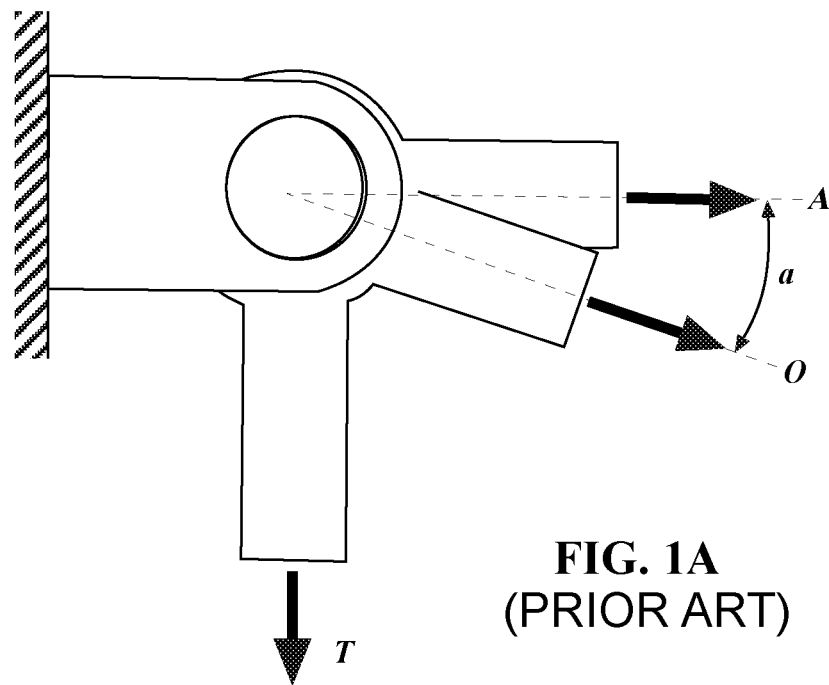
FIG. 1A is a diagram showing the various directions of loads on a lug.

FIG. 1A shows the various directions of loads that may act on a lug, which is determined by the relative angles of the lug 12 and the two prongs 18A and 18B. If the loaded leg of the lug 12 is aligned with the two prongs 18A and 18B, the load will be an axial load that is applied to the joint along the axis A (or centerline). If the loaded leg of the lug 12 is oriented perpendicular to the two prongs 18A and 18B, the load applied to the joint is considered to be a "transverse" load T. If the loaded leg of the lug 12 is joined at an angle, α, of less than 90° to the two prongs 18A and 18B (as depicted by the joint geometry of FIG. 1), the load is considered to be an "oblique" load O.

Figures 1B, 2:
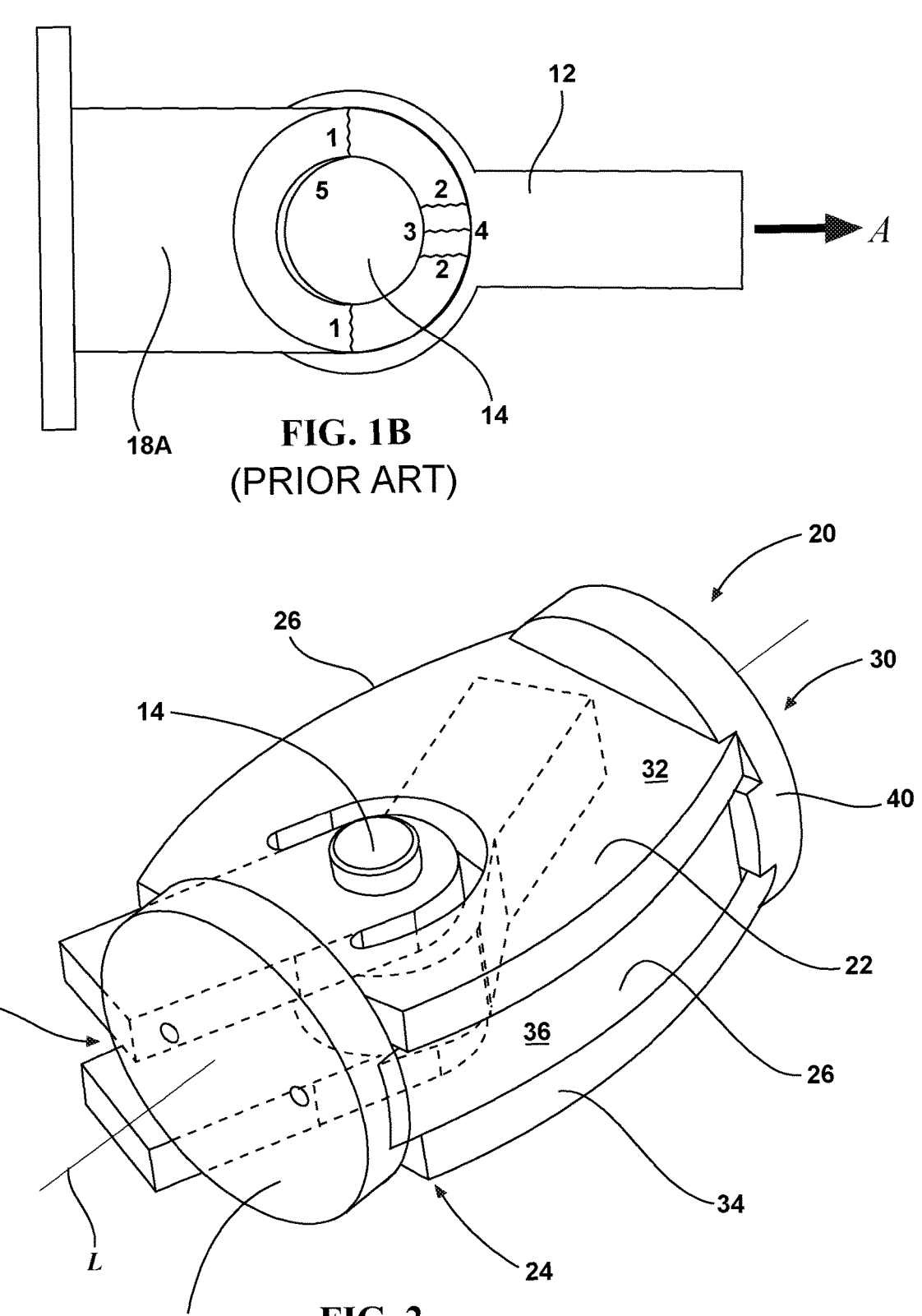
FIG. 1B is a diagram showing typical failure modes of a lug.
FIG. 2 is a perspective view of one embodiment of a fixture for testing a lug joint in tension using a compression testing machine and an outline of the obliquely loaded lug joint therein.

FIG. 1B shows typical failure modes of a lug when an axial load is applied. These include: 1) tension failure across the net section; 2) shear failure along two planes; 3) bearing failure; 4) hoop tension failure/fraction on a single plane; and 5) pin shear failure.

FIG. 2 shows a first non-limiting embodiment of fixture 20 for testing articles in tension when using compression loading. The fixture 20 shows an outline of the obliquely loaded lug joint therein that the fixture will simulate. The fixture has a longitudinal centerline L, a top 22, a bottom 24, a pair of sides 26, and a pair of ends comprising a first end 28 and a second end 30. The terms "top", "bottom" refer to the orientation of the fixture 20 shown in the drawings. It is understood that these descriptions are not limiting, and that the fixture 20 may be placed in other orientations. The fixture 20 may generally comprise three parallel plates comprising a first outer plate 32, a second outer plate 34, an inner plate (or "center plate") 36; and a pair of end plates, first end plate 38 and second end plate 40. A clevis pin 14 is inserted through holes in the three parallel plates 32, 34, and 36.

The three parallel plates 32, 34, and 36 are designed to correspond to the components of the joint being analyzed. The outer plates 32 and 34 form the clevis 16, and the inner plate 36 forms the lug 12. The parallel plates 32, 34, and 36 each have a pin-accepting hole therein, and each has a slot that is in the configuration of the corresponding shape of the component of the lug joint, as described more fully herein.

The three plates are designed such that the loading experienced by the clevis-lug joint simulated by the fixture 20 is identical to that seen in service. Some analysis (e.g., finite element analysis) may be used to verify this is the case, in order to tailor the geometry of the cut-outs in the plates that form the slots to achieve the desired loading. In regions of analytical interest, the parallel plates representing the lug and clevis should be of the same material and thicknesses as the geometry being represented, but the plates do not necessarily have to have that same thickness over their entire area. For example, the thickness of the plates could taper to a reduced thickness in the region of the lug components. The pin 14 should be of the same diameter and material as the actual pin being represented. If plate buckling is a concern, the fixture may be provided with anti-buckling features to prevent buckling.

Figure 3:
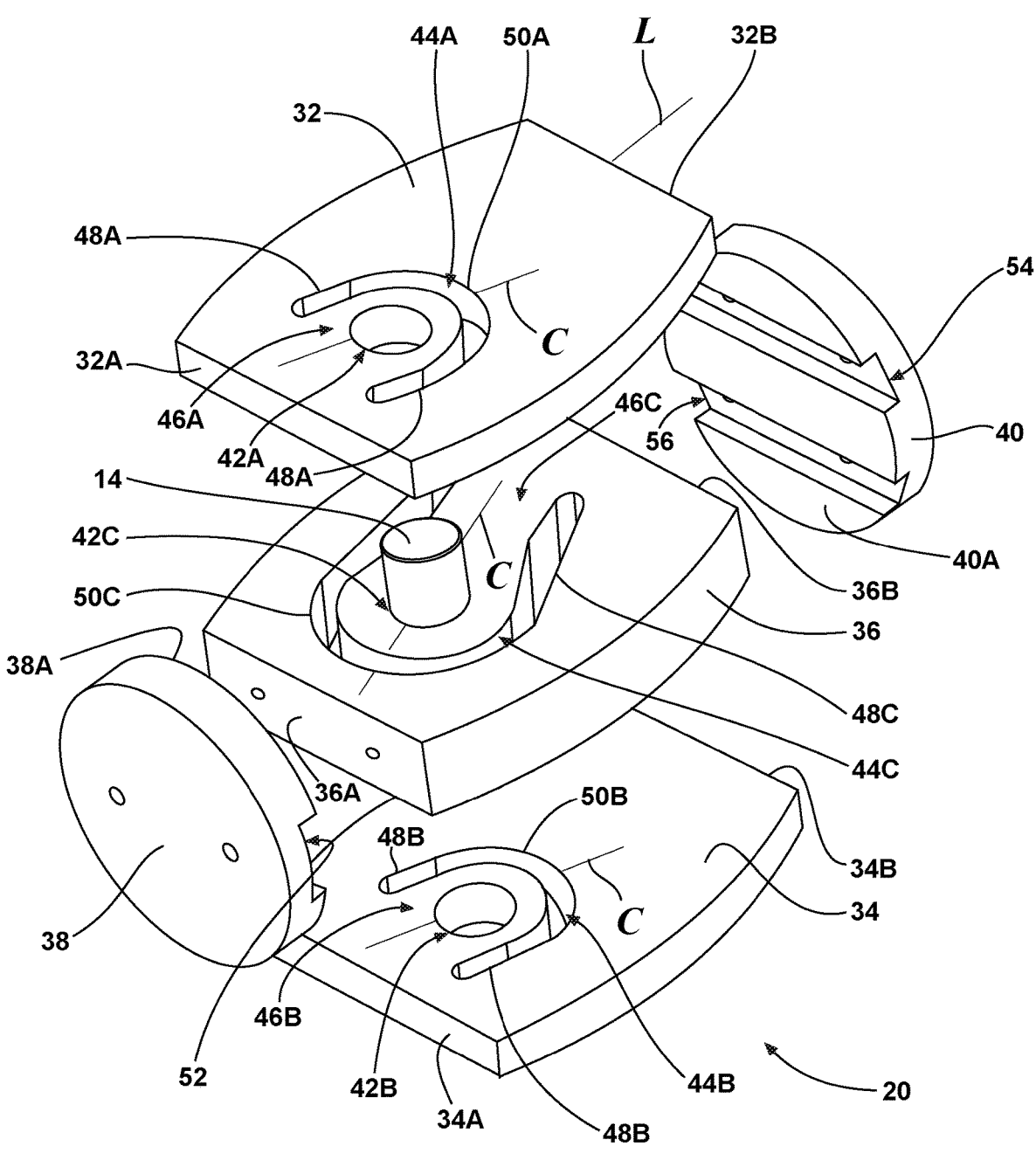
FIG. 3 is an exploded perspective view of the fixture shown in FIG. 2.

FIG. 3 shows that the first outer plate 32 has a first end 32A and a second end 32B. The first outer plate 32 has a pin-accepting hole 42A therethrough. The first outer plate 32 also has a first slot 44A therethrough that is spaced apart from the pin-accepting hole 42A that partially surrounds the pin-accepting hole 42A. The first slot 44A can be considered to have a pair of legs (or "leg portions") 48A and a connecting portion (or "end portion") 50A that connects the legs. The first slot has an open end 46A. The open end 46A is the space between the legs 48A. In this embodiment, the first slot 44A is configured so that the region inside the slot 44A has the same profile as the end of the first prong 18A of the clevis 16 shown in FIG. 1.

The second outer plate 34 has a first end 34A and a second end 34B. The second outer plate 34 has a pin-accepting hole 42B therethrough. The second outer plate 34 also has a second slot 44B therethrough that is spaced apart from the pin-accepting hole 42B that partially surrounds the pin-accepting hole 42B. The second slot 44B can be considered to have a pair of legs (or "leg portions") 48B and a connecting portion (or "end portion") 50B that connects the legs. The second slot has an open end 46B. The open end 46B is the space between the legs 48B. In this embodiment, the second slot 44B is configured so that the region inside the slot 44B has the same profile as the end of the second prong 18B of the clevis 16 shown in FIG. 1.

The inner plate 36 has a first end 36A and a second end 36B. The inner plate 36 has a pin-accepting hole 42C therethrough. The inner plate 36 also has a third slot 44C therethrough that is spaced apart from the pin-accepting hole 42C and partially surrounds the pin-accepting hole 42C. The third slot 44C can be considered to have a pair of legs (or "leg portions") 48C and a connecting portion (or "end portion") 50C that connects the legs. The third slot 44C has an open end 46C. The open end 46C is the space between the legs 48C. In this embodiment, the third slot 44C is configured so that the region inside the slot 44C has the same profile as the end of the lug 12 of the lug joint 10 shown in FIG. 1.

The first outer plate 32, the second outer plate 34, and the inner plate 36 are stacked with the inner plate 36 located between the outer plates. The pin-accepting holes 42A, 42B, and 42C will be the same diameter as the hole in the lug joint (the diameter of the pin is usually slightly smaller than the holes). The three parallel plates 32, 34, and 36 are arranged such that their holes 42A, 42B, and 42C are aligned to accept the lug pin 14 through all three holes.

The slots 44A, 44B, and 44C in the three parallel plates 32, 34, and 36, respectively, can be any suitable configuration that corresponds to the shape of the components of the lug joint to be tested. The leg portions and connecting portion can be formed by linear slot segments, curvilinear slot segments, or combinations of linear slot segments and curvilinear slot segments. The leg portions of a given slot can be parallel to each other, or they may be angled either inwardly, or outwardly, toward the open end of the slot. The connecting portion of a slot may, in some cases, comprise a curved segment. In the embodiment shown in FIGS. 2 and 3, the leg portions of the first and second slots 44A and 44B comprise two straight segments and the connecting portion is a curved segment. The leg portions 48C of the third slot 44C are each comprised of two linear segments that form an obtuse angle relative to each other, and the connecting portion 50C is a curved segment.

In some cases, at least one of the slots 44A, 44B, and 44C may be considered to be "generally U-shaped". The term "generally U-shaped", as used herein, refers to a shape that has a pair of legs extending from a straight or convexly-curved connecting portion, where the ends of the legs are spaced apart. The connecting portion may be curved in the configuration of an uppercase letter "U" which configuration forms a 180° bend, but it may have any other suitable convexly-curved configurations. Such other convexly-curved configurations may include, but are not limited to: configurations in which the convexly-curved portion has an overall width that is narrower than the width of portions of the legs that are joined thereto such that the convexly-curved portion forms less than a 180° bend; and configurations in which the convexly-curved portion has an overall width that is wider than the width of portions of the legs that are joined thereto such that the convexly-curved portion forms more than a 180° bend. In the latter case, the convexly-curved portion may, for example, form a portion of a circle. The legs may be substantially parallel to each other, or they may be angled either inwardly, or outwardly from the connecting portion relative to each other.

The slots 44A, 44B, and 44C may each be of uniform width along their legs and connecting portion. Alternatively, the width of the slots may vary along their legs and/or connecting portion. The slots 44A, 44B, and 44C should be made wide enough to accommodate the deformation of the joint during testing. The slots should, therefore, not be so narrow that they close during testing before the test load is reached. The slots should not be so wide, however, that they cause the fixture 20 to be too flexible and to deform in undesired ways when under compression.

FIG. 3 shows that, in one embodiment, the open end 46C of the third slot 44C is oriented in a different direction than the open ends 46A and 46B of the first and second slots 44A and 44B, respectively. The different direction is an opposing direction which is generally in the opposite direction. The slots can each be considered to have a centerline C that extends through the center of their connecting portion and through points that are equidistant from each of their legs. The centerline C of the first slot 44A may be referred to as a "first centerline", the centerline C of the second slot 44B may be referred to as a "second centerline", and the centerline C of the third slot 44C may be referred to as a "third centerline". In FIG. 3, the open ends are not oriented in 180° opposite directions. The slots are oriented at an acute angle relative to the longitudinal centerline L of the fixture 20, and of the particular plate to correspond to the oblique nature of the joint depicted in FIG. 1. The orientation of the slots will change when testing an axial load or a transverse load. If an axial load is being simulated, the open ends of the slots will be oriented in 180° opposite directions. If a transverse load is being simulated, the open ends of the slots will be oriented at a 90° angle relative to each other.

The end plates comprise a first end plate 38 and a second end plate 40. FIG. 3 shows that the first end plate 38 may have a first groove (or channel) 52 on its inwardly-facing surface 38A. The first groove 52 passes generally through the center portion of the inwardly-facing surface 38A of the first end plate 38. The first groove 52 may extend from one side of the first end plate 38 to the other side of the first end plate. The first groove 52 is sized and configured so that the first end 36A of the inner plate 36 may fit therein. The second end plate 40 may have a pair of spaced-apart grooves (or channels) 54 and 56 on its inwardly-facing surface 40A. These may be referred to as the second and third grooves 54 and 56, respectively. The second and third grooves 54 and 56 pass above and below the center portion of the second end plate 40. The second and third grooves 54 and 56 may extend from one side of the second end plate 40 to the other side of the second end plate. The second and thirds grooves 54 and 56 are sized and configured so that the second ends 32B and 34B of the outer plates 32 and 34 may, respectively, fit therein.

Figure 4:
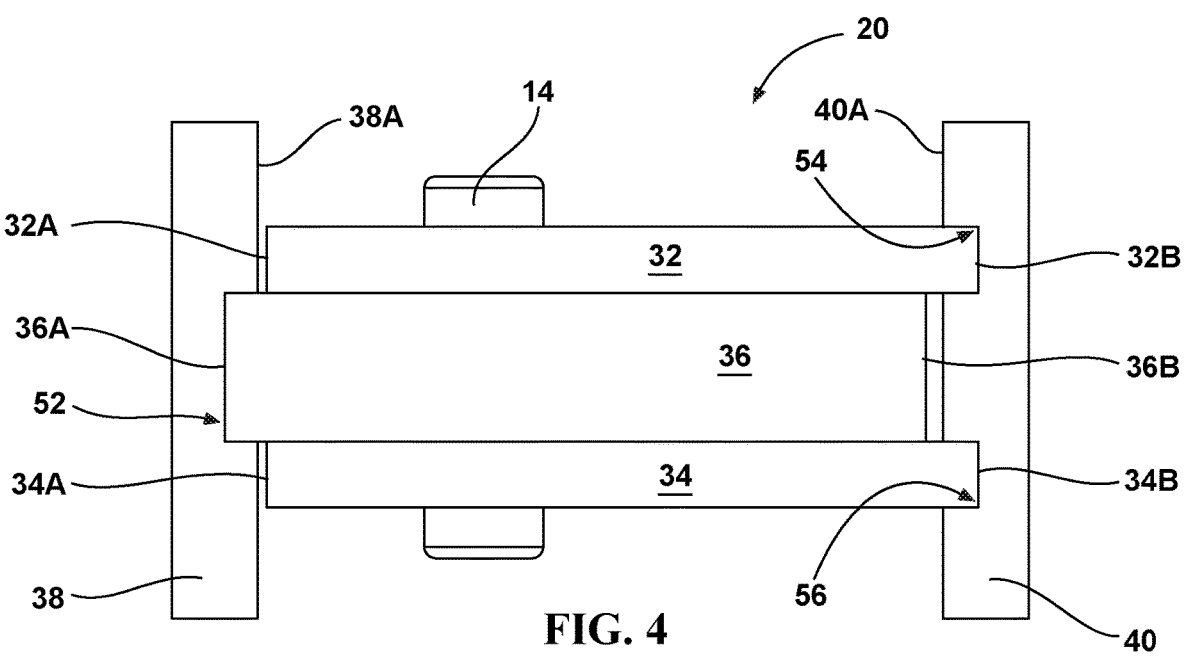
FIG. 4 is a side view of the fixture shown in FIG. 2.

FIG. 4 shows that the end plates 38 and 40 are positioned so that the first end plate 38 is positioned adjacent the first ends 32A, 34A, and 36A of the three stacked plates 32, 34, and 36. The second end plate 40 is positioned adjacent to the second ends 32B, 34B, and 36B of the three stacked plates 32, 34, and 36. The inner plate 36 fits into the first groove 52 and is joined to the inside surface 38A of the first end plate 38 at the first end of the fixture 20. The inner plate 36 does not reach the inside end 40A of the second end plate 40 at the second end of the fixture 20—there is a gap. The outer two plates 32 and 34 fit into the second and third grooves 54 and 56, respectively, and are joined to the inside surface 40A of the second end plate 40 at the second end of the fixture. The outer plates 32 and 34 do not reach the inside end 38A of the first end plate 38 at the first end of the fixture—there is a gap.

The outer plates 32 and 34 and the inner plate 36 are arranged relative to the end plates 38 and 40 so that the outer plates are movable/slidable only in a direction from the second end plate 40 toward the first end plate 38. The inner plate 36 is arranged so that it is movable/slidable only in a direction from the first end plate 38 toward the second end plate 40. The gaps allow the fixture 20 to deform (compress) under load.

Figure 5:
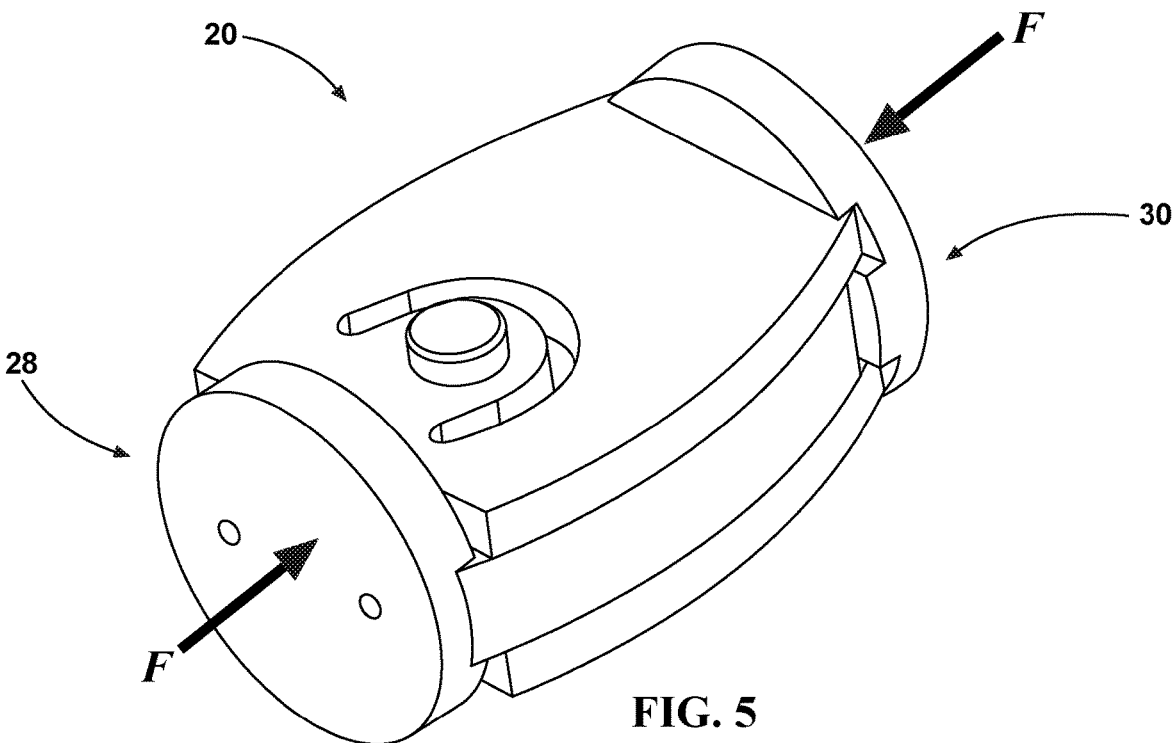
FIG. 5 is a perspective view of the fixture in FIG. 2 showing how compressive forces are applied thereto.

FIG. 5 shows that the compressive load F is applied to the ends 28 and 30 of the fixture 20. The gaps at the plate ends force the lug pin 14 and the internal lug components to react to the compressive load, and the clevis lug components to act as if under tension loading.

Figure 6:
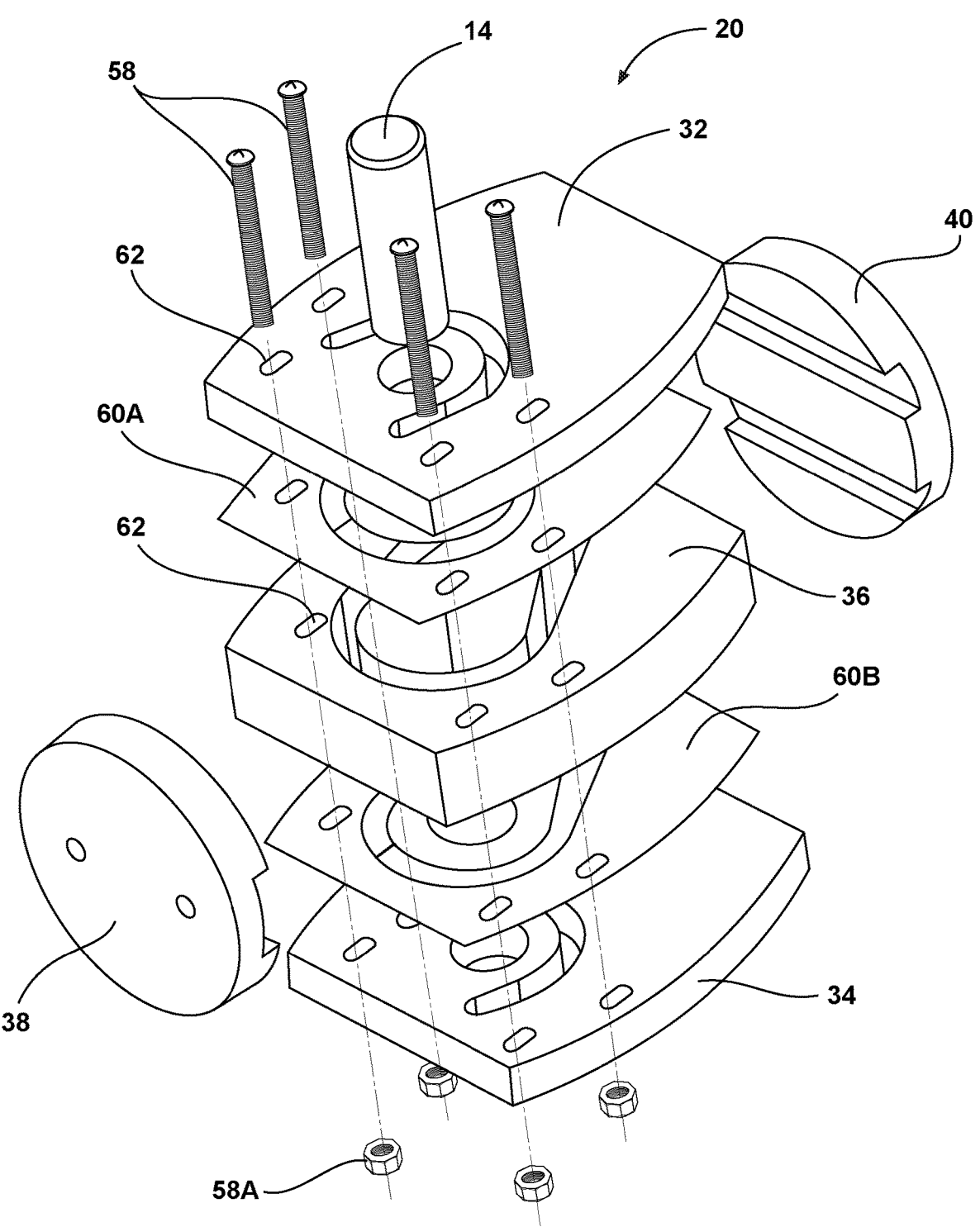
FIG. 6 is an exploded perspective view of a version of the fixture shown in FIG. 2 which has been provided with anti-buckling features.

FIG. 6 shows that the fixture 20 may be provided with anti-buckling features for cases in which the three stacked plates 32, 34, and 36 are relatively thin, and compressive buckling is a concern. The anti-buckling features include through bolts 58 and friction reducing plies 60A and 60B between the stacked plates to prevent plate buckling. In the embodiment shown, there are four through bolts 58. The through bolts 58 pass through spaced-apart holes 62 in the three stacked plates 32, 34, and 36 and the friction reducing plies 60A and 60B to allow the plates to move relative to one another without buckling. Finger-tight nuts 58A retain the bolts 58 in place. The holes 62 may be in the form of any suitable combination of longitudinally-oriented slots or circular holes in any of the stacked plates 32, 34, and 36 and friction reducing plies 60A and 60B. For instance, as shown in FIG. 6, all of these stacked components may have a plurality of (e.g., four) longitudinally-oriented slots therein. The longitudinally-oriented slots may be referred to as "additional slots" to further distinguish the same from the first, second, and third slots. In another example, one of the pairs of longitudinally-oriented slots that are located the same distance from the first end of the respective plates could be replaced with circular holes, provided the relative sliding motion of the stacked plates 32, 34 and 36 is not inhibited thereby.

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

The size of the fixture 20 is completely tailorable to the joint size, and limited only by the size of fixture that the test machine can accept.

FIGS. 7 and 8 show a second version of a prior art clevis fastener. In this version of the clevis fastener, the lug 12 is shaped similarly to the lug shown in FIG. 1. The end portion of the lug 12 that the pin 14 passes through may have a bulbous shape. The clevis 16, and the end of the first and second prongs 18A and 18B may also have a bulbous, or generally partial circular shaped configuration. That is, there is a bulbous or generally circular portion 19A at the end of the clevis portions that receive the pin 14 when viewed looking at the end of the pin 14. The bulbous, or generally circular portion 19A is joined to a stem portion 19B. When viewed from the direction shown in FIG. 7, the bulbous, or generally circular portion 19A is wider than the stem portion 19B. In this embodiment, both left and right halves 18A and 18B of the clevis 16 have the same configuration.

FIGS. 9 and 10 show the plates 32 and 36 that can be used in a second embodiment of the fixture. The fixture 20 can have all of the same components shown in the preceding figures. The fixture 20 is provided with plates 32, 34, and 36 that have slots therein that have an alternative configuration to simulate the second version of the clevis fastener shown in FIGS. 7 and 8. The plates are also configured to test articles in tension therein. However, in this embodiment, rather than simulating an oblique load, the plates are configured to simulate an axial load.

In FIG. 9, the first outer plate 32 is shown. In this second embodiment, the first and second outer plates 32 and 34 both have the same configuration. In this embodiment, the first slot 44A can be thought of as being key-hole shaped. As in the first embodiment, the first slot 44A has an open end 46A, a pair of legs (or "leg portions") 48A and a connecting portion (or "end portion") 50A that connects the legs. The connecting portion 50A is a convexly-curved portion (when viewed from outside the slot) that forms a portion of a circle. The legs 48A are substantially parallel to each other, and are spaced apart a distance that is less than the width of the connecting portion 50A. In the embodiment shown, the centerline C of the first slot 44A is oriented so that it will coincide with the longitudinal centerline L of the fixture 20. The second outer plate, and the slot therein, will have the same configuration as the first outer plate 32.

In this embodiment, the inner plate 36 has a third slot 44C therein that has a similar configuration as the first and second slots. The third slot 44C may have all the same properties described above for the first slot 44A in this embodiment. The third slot 44C, however, may have slightly smaller dimensions than the first and second slot to correspond to the difference in size between the lug 12 and the clevis 16 components. The third slot 44C is also oriented in the opposite direction relative to the first slot 44A so that the opening 46C between the leg portions 48C will face the second end 36B of the inner plate 36 when the inner plate is placed into the fixture 20.

Figures 11, 12:
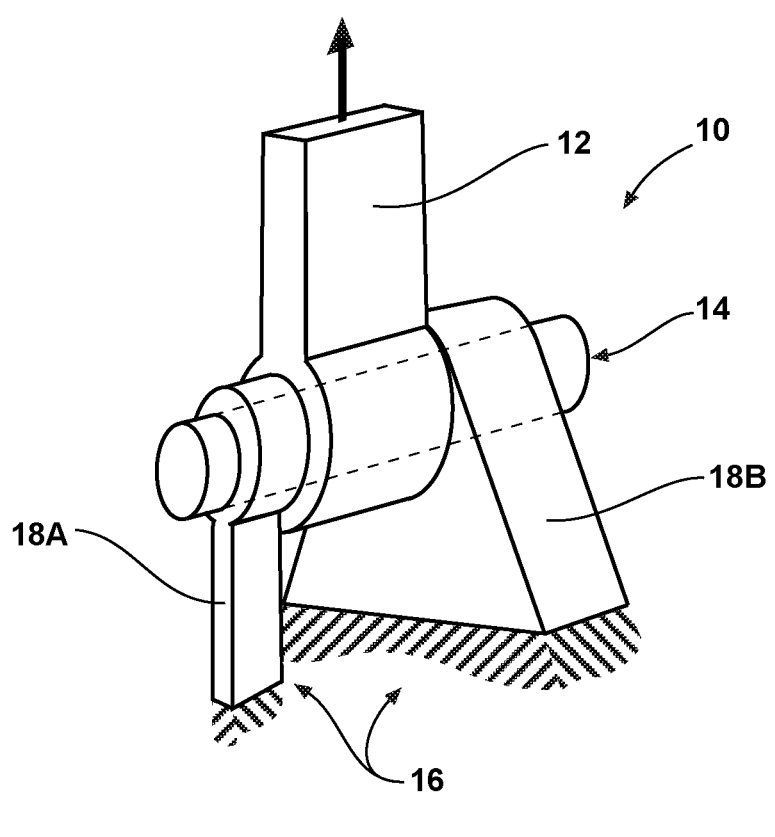
FIG. 11 is a perspective view of another alternative prior art clevis fastener.
FIG. 12 is a side view of the alternative clevis fastener shown in FIG. 11.

FIGS. 11 and 12 show a third version of a prior art clevis fastener 10. In this version of the clevis fastener 10, the two prongs 18A and 18B of the clevis 16 have different configurations. The ends of the two prongs 18A and 18B are joined to another component or article, the surface of which is shown in FIG. 11.

Figures 13, 14, 15:
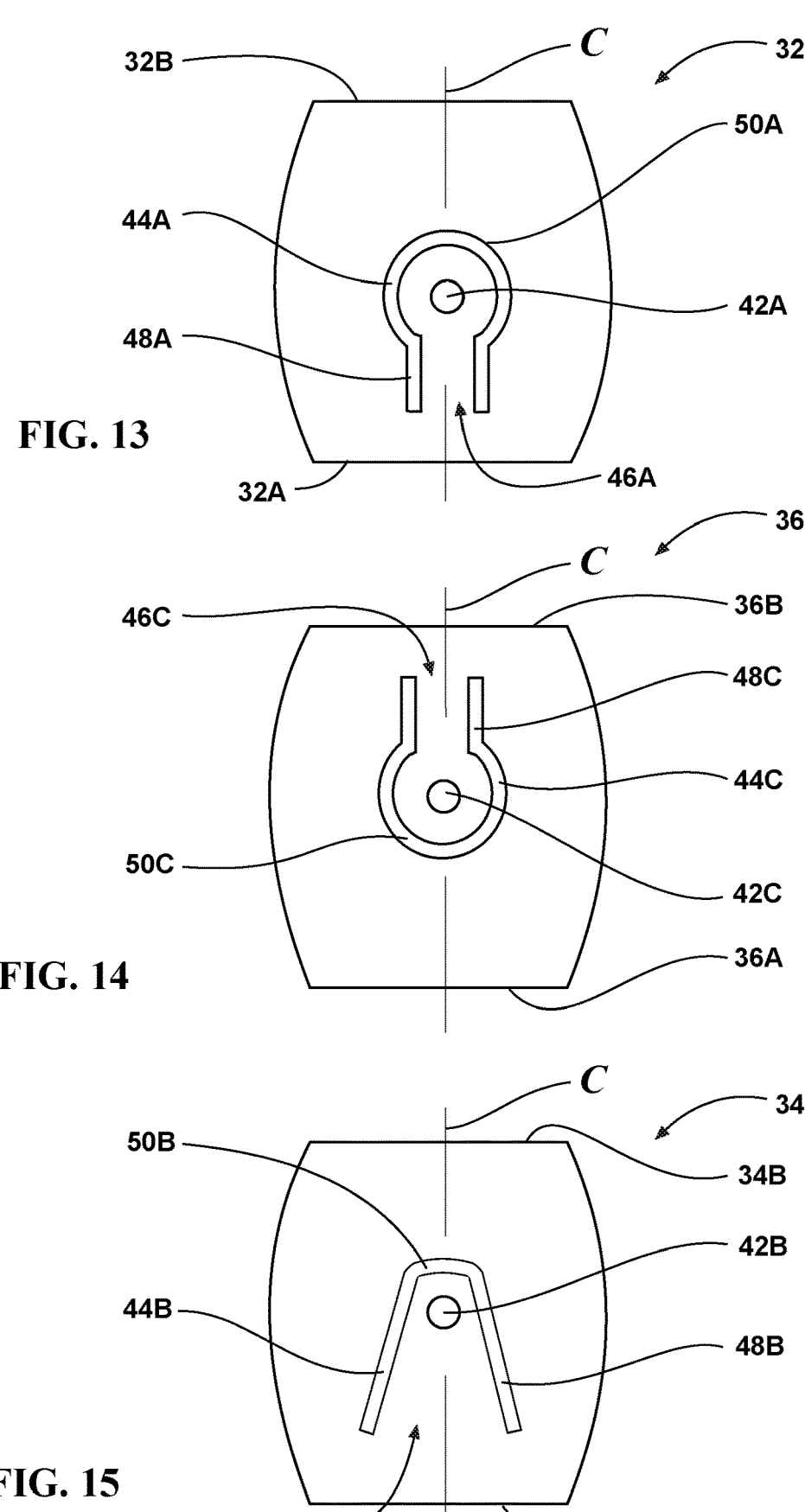
FIG. 13 is a plan view of the first outer plate that can be used in a compression test fixture to simulate a prong of the clevis fastener shown in FIG. 11.
FIG. 14 is a plan view of the inner plate that can be used in a compression test fixture to simulate the lug of the clevis fastener shown in FIG. 11.
FIG. 15 is a plan view of the second outer plate that can be used in a compression test fixture to simulate a prong of the clevis fastener shown in FIG. 11.

A third embodiment of the fixture 20 that simulates the third version of the clevis fastener is provided to test articles in tension therein. The fixture 20 can have all of the same components shown in the preceding figures. FIGS. 13-15 show the plates 32, 34, and 36 that can be used in a third embodiment of the fixture 20.

FIG. 13 shows the first outer plate 32. The first outer plate 32 has a first pin-accepting hole 42A and a first slot 44A. In this embodiment, the first outer plate 32 and the first slot 44A therein can be similar in most, or all respects, to the first outer plate 32 of the second embodiment.

FIG. 14 shows the inner plate 36. The inner plate 36 has a third pin-accepting hole 42C and a third slot 44C. In this embodiment, the inner plate 36 and the third slot 44C therein can be similar in most, or all respects, to the inner plate 36 of the second embodiment.

FIG. 15 shows the second outer plate 34. The second outer plate 34 has a pin-accepting hole 42B therethrough. The second outer plate 34 also has a second slot 44B therethrough that is spaced apart from the pin-accepting hole 42B that partially surrounds the pin-accepting hole 42B. As in the case of the prior embodiments, in this embodiment, the second slot 44B has an open end 46B, a pair of legs 48B, and a connecting portion 50B that connects the legs. In this embodiment, the second slot 44B is configured so that the region inside the slot 44B has the same configuration as the end of the second prong 18B of the clevis 16 shown in FIGS. 11 and 12. As a result, the leg portions 48B of the second slot 44B are angled outwardly toward the open end 46B of the slot.

The testing fixture 20 can be made of any suitable materials and in any suitable manner. The materials of the components of the testing fixture 20 that simulate the lug joint (the three stacked plates) and the pin are preferably made out of the same materials as the corresponding components of the lug joint. Suitable materials include, but are not limited to, steel, aluminum and titanium alloys; as well as other metallic and non-metallic materials. The components of the testing fixture 20 may be made using conventional machine shop processes and tools. The plates may, therefore, be cut to shape and the pin-accepting holes may be drilled in the plates, and the slots may be milled.

The invention is used by placing testing fixture 20 in a compression test machine as shown in FIG. 5, and loading the testing fixture 20 to the desired load, then witnessing and recording the mechanical behavior during the test and, ultimately, the failure mode(s) experienced by the joint.

The fixtures and methods described herein can provide a number of advantages. It should be understood, however, that these advantages need not be required unless they are set forth in the appended claims.

The fixtures provide a means of testing and evaluating tension lug fittings when only compression-loading is available. Typically, loading a lug configuration in compression results in significantly different behavior than loading in tension, and does not allow all failure modes to be explored. The fixture described herein, however, allows tension loading of the lug configuration to be simulated using compression-only loading. The failure modes of (1) net section tension failure, (2) shear failure along two planes, (3) bearing failure, (4) hoop tension failure along a single plane and (5) pin shear failure can be captured, as the lug elements experience tension loading internal to the fixture, despite the external loading being compressive. The fixtures are useful in a laboratory environment in which tensile loading machines of sufficient capacity may not exist, but compression-loading machines of sufficient capacity are available.

As used herein, an element or step recited in the singular and preceded with the word "a" or "an" should be understood as including the plural of such elements or steps, unless the plural of such elements or steps is specifically excluded.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A fixture for testing articles in tension when using compression loading, said fixture comprising:

a first outer plate having a pin-accepting hole therethrough and a first slot therethrough that is spaced apart from the pin-accepting hole and partially surrounds the pin-accepting hole, wherein said first slot has an open end;

a second outer plate having a pin-accepting hole therethrough and a second slot therethrough that is spaced apart from the pin-accepting hole and partially surrounds the pin-accepting hole, wherein said second slot has an open end;

an inner plate having a pin-accepting hole therethrough and a third slot therethrough that is spaced apart from the pin-accepting hole and partially surrounds the pin-accepting hole, wherein said third slot has an open end, and the first outer plate, the second outer plate, and the inner plate are stacked with the inner plate located between the outer plates, wherein the first outer plate, the second outer plate, and the inner plate each have a pair of spaced apart sides and a pair of spaced apart ends, said ends comprising first ends and second ends; and a pair of end plates comprising a first end plate and a second end plate, said end plates arranged so that the first end plate is positioned adjacent the first ends of the first outer plate, the second outer plate, and the inner plate, and the second end plate is positioned adjacent the second end of the first outer plate, the second outer plate, and the inner plate, wherein the pin-accepting holes in the first outer plate, the second outer plate, and the inner plate are aligned, and the opening in the third slot is oriented in a different direction than the openings in the first and second slots, and the first and second outer plates and the inner plate are arranged relative to the end plates so that the outer plates are slidable only in a direction from the second end plate toward the first end plate, and the inner plate is slidable only in a direction from the first end plate toward the second end plate.

2. The fixture of claim 1 wherein the first, second, and third slots each have two leg portions and a connecting portion connecting the legs.

3. The fixture of claim 2 wherein the leg portions comprise two straight segments and the connecting portion is a curved segment.

4. The fixture of claim 2 which has a longitudinal axis, wherein the first, second, and third slots each have a centerline, wherein the centerline of the first slot comprises a first centerline, the centerline of the second slot comprises a second centerline, and the centerline of the third slot comprises a third centerline, and there is space between the leg portions of each of the first, second, and third slots, wherein said space forms an open end of the respective first, second, and third slots.

5. The fixture of claim 4 wherein open ends of the first and second slots are oriented in a first direction, and first and second centerlines are oriented parallel to the longitudinal axis of the fixture, and the open end of the third slot is oriented in the opposite direction relative to the open ends of the first and second slots, and the third centerline is oriented parallel to the longitudinal axis, so that the third slot forms a 180° angle relative to the first and second slots so that said fixture is configured to simulate an axial load.

6. The fixture of claim 4 wherein the first and second centerlines of the respective first and second slots are oriented at a first oblique angle relative to the longitudinal axis of the fixture, and the third centerline of the third slot is oriented at second oblique angle relative to the longitudinal axis, wherein the third centerline forms an obtuse angle relative to the first and second centerlines so that said fixture is configured to simulate an oblique load.

7. The fixture of claim 4 wherein the first and second centerlines of the respective first and second slots are oriented at a first angle relative to the longitudinal axis of the fixture, and the third centerline of the third slot is oriented at a second angle relative to the longitudinal axis, wherein the first and second centerlines form a 90° angle relative to the third centerline so that said fixture is configured to simulate a transverse load.

8. The fixture of claim 1 wherein the first, second, and third slots are generally U-shaped.

9. A method for testing articles in tension when using compression loading, said method comprising:

a) providing a fixture comprising:

a first outer plate having a pin-accepting hole therethrough and a first slot therethrough that is spaced apart from the pin-accepting hole and partially surrounds the pin-accepting hole, wherein said first slot is in the configuration of a first prong of a clevis that will hold the lug to be tested and said first slot has an open end;

a second outer plate having a pin-accepting hole therethrough and a second slot therethrough that is spaced apart from the pin-accepting hole and partially surrounds the pin-accepting hole, wherein said second slot is in the configuration of a second prong of a clevis that will hold the lug to be tested and said second slot has an open end;

an inner plate having a pin-accepting hole therethrough and a third slot therethrough that is spaced apart from the pin-accepting hole and partially surrounds the pin-accepting hole, wherein said third slot is in the configuration of a lug to be tested and has an open end, and the first outer plate, the second outer plate, and the inner plate are stacked with the inner plate located between the outer plates, wherein the first outer plate, the second outer plate, and the inner plate each have a pair of spaced apart sides and a pair of spaced apart ends, said ends comprising first ends and second ends; and a pair of end plates comprising a first end plate and a second end plate, said end plates positioned so that the first end plate is positioned adjacent the first ends of the first outer plate, the second outer plate, and the inner plate, and the second end plate is positioned adjacent the second end of the first outer plate, the second outer plate, and the inner plate, wherein the pin-accepting holes in the first outer plate, the second outer plate, and the inner plate are aligned, and the opening in the third slot is oriented in a different direction than the openings in the first and second slots, and the first and second outer plates and the inner plate are arranged relative to the end plates so that the outer plates are slidable only in a direction from the second end plate toward the first end plate, and the inner plate is slidable only in a direction from the first end plate toward the second end plate; and b) placing a pin through the pin-accepting holes in the first outer plate, the second outer plate, and the inner plate; and c) placing the fixture in a compression testing apparatus and applying compressive force to the end plates of the fixture.

\* \* \* \* \*